US008874779B2

(12) United States Patent
Ma et al.

(10) Patent No.: US 8,874,779 B2
(45) Date of Patent: Oct. 28, 2014

(54) METHOD AND APPARATUS FOR RETRIEVING AND RENDERING LIVE STREAMING DATA

(75) Inventors: Kevin J. Ma, Nashua, NH (US); Jianguo Xu, Newton, MA (US); Raj Nair, Lexington, MA (US); Ichang Lin, Westborough, MA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 291 days.

(21) Appl. No.: 13/233,838

(22) Filed: Sep. 15, 2011

(65) Prior Publication Data

US 2012/0005366 A1    Jan. 5, 2012

Related U.S. Application Data

(63) Continuation of application No. PCT/US2010/027893, filed on Mar. 19, 2010.

(60) Provisional application No. 61/161,641, filed on Mar. 19, 2009, provisional application No. 61/265,391, filed on Dec. 1, 2009.

(51) Int. Cl.
| | |
|---|---|
| *G06F 15/16* | (2006.01) |
| *H04N 21/63* | (2011.01) |
| *H04N 21/442* | (2011.01) |
| *H04N 21/6437* | (2011.01) |
| *H04N 21/6373* | (2011.01) |
| *H04N 21/845* | (2011.01) |
| *H04N 21/643* | (2011.01) |
| *H04N 21/61* | (2011.01) |
| *H04L 29/08* | (2006.01) |
| *H04L 29/06* | (2006.01) |

(52) U.S. Cl.
CPC .......... *H04L 65/4076* (2013.01); *H04N 21/631* (2013.01); *H04N 21/44209* (2013.01); *H04N 21/6437* (2013.01); *H04N 21/6373* (2013.01); *H04N 21/8456* (2013.01); *H04N 21/64322* (2013.01); *H04N 21/6125* (2013.01); *H04L 67/02* (2013.01); *H04L 65/605* (2013.01); *H04L 65/608* (2013.01)
USPC .......................................... 709/231; 709/200

(58) Field of Classification Search
CPC . H04L 65/4076; H04L 65/605; H04L 65/608; H04L 67/02; H04N 21/6437
USPC ........................................................ 709/231
See application file for complete search history.

(56) References Cited

U.S. PATENT DOCUMENTS

| | | | |
|---|---|---|---|
| 7,047,305 B1 * | 5/2006 | Brooks et al. ................. | 709/231 |
| 7,085,843 B2 | 8/2006 | Buddhikot et al. | |

(Continued)

OTHER PUBLICATIONS

Pantos, R., HTTP Live Streaming: http://tools.ietf.org/html/draft-pantos-http-live-streaming-04, Apple Inc., Jun. 5, 2010, 23 pages.

(Continued)

*Primary Examiner* — Anthony Mejia

(57) ABSTRACT

A live streaming system/method provides cross platform live streaming capabilities to mobile devices. A file format compatible with legacy HTTP infrastructure is used to deliver media over a persistent connection. Legacy client media players can dynamically change the encoded rate of the media delivered over a persistent connection. Standard HTTP servers may be used without modification, leveraging standard media players embedded in mobile devices for seamless media delivery over wireless networks with high bandwidth fluctuations.

28 Claims, 10 Drawing Sheets

(56) References Cited

U.S. PATENT DOCUMENTS

| | | | |
|---|---|---|---|
| 7,823,083 B2* | 10/2010 | Rohrabaugh et al. | 715/815 |
| 8,125,908 B2* | 2/2012 | Rothstein et al. | 370/235 |
| 8,610,603 B2* | 12/2013 | Lai et al. | 341/51 |
| 2001/0014058 A1 | 8/2001 | Ando et al. | |
| 2002/0023165 A1* | 2/2002 | Lahr | 709/231 |
| 2002/0174444 A1 | 11/2002 | Gatto et al. | |
| 2003/0115340 A1* | 6/2003 | Sagula et al. | 709/228 |
| 2003/0135631 A1 | 7/2003 | Li et al. | |
| 2003/0149792 A1 | 8/2003 | Goldstein | |
| 2003/0159143 A1* | 8/2003 | Chan | 725/41 |
| 2003/0204602 A1* | 10/2003 | Hudson et al. | 709/228 |
| 2004/0109137 A1* | 6/2004 | Bubie et al. | 352/40 |
| 2004/0117427 A1* | 6/2004 | Allen et al. | 709/200 |
| 2004/0196972 A1 | 10/2004 | Zhu et al. | |
| 2004/0240390 A1* | 12/2004 | Seckin | 370/252 |
| 2005/0180415 A1* | 8/2005 | Cheung et al. | 370/389 |
| 2006/0015637 A1 | 1/2006 | Chung | |
| 2006/0184688 A1 | 8/2006 | Ganguly et al. | |
| 2006/0294572 A1* | 12/2006 | Walter | 725/140 |
| 2007/0050828 A1 | 3/2007 | Renzi et al. | |
| 2007/0078897 A1* | 4/2007 | Hayashi et al. | 707/104.1 |
| 2007/0106680 A1 | 5/2007 | Haot et al. | |
| 2007/0250901 A1* | 10/2007 | McIntire et al. | 725/146 |
| 2008/0140719 A1 | 6/2008 | Chaney et al. | |
| 2008/0195746 A1 | 8/2008 | Bowra et al. | |
| 2008/0281977 A1* | 11/2008 | Branam et al. | 709/231 |
| 2009/0003600 A1* | 1/2009 | Chen et al. | 380/217 |
| 2009/0006643 A1* | 1/2009 | Lee | 709/231 |
| 2009/0030687 A1* | 1/2009 | Cerra et al. | 704/243 |
| 2009/0034434 A1* | 2/2009 | Tsang et al. | 370/256 |
| 2009/0180484 A1 | 7/2009 | Igarashi | |
| 2009/0300204 A1* | 12/2009 | Zhang et al. | 709/231 |
| 2010/0036963 A1* | 2/2010 | Gahm et al. | 709/231 |
| 2010/0131671 A1* | 5/2010 | Kohli et al. | 709/233 |
| 2011/0090953 A1* | 4/2011 | Melnyk et al. | 375/240.03 |
| 2012/0084404 A1* | 4/2012 | Haot et al. | 709/219 |
| 2012/0117659 A1* | 5/2012 | Gearhart et al. | 726/27 |
| 2012/0275597 A1* | 11/2012 | Knox et al. | 380/210 |

OTHER PUBLICATIONS

Zambelli, Alex, "Alex Zambelli's Microsoft Media Blog, Microsoft Media Platform, streaming video, Smooth Streaming, H.264, VC-1, Silverlight, Windows Media," 21 pages, (c) 2012, Silverlight smooth streaming: http://alexzambelli.com/blog/2009/02/10/smooth-streaming-architecture/, Proudly powered by WordPress. 2010 Weaver by WPWeaver.info.

Schulzrine, H., Real Time Streaming Protocol (RTSP): RTSP—RFC2326: http://www.rfc-editor.org/rfc/rfc2326.txt, Columbia U., Apr. 1998, 82 pages.

Schulzrine, H., RTP: A Transport Protocol for Real-Time Applications: RTP—RFC3550: http://www.rfc-editor.org/rfc/rfc3550.txt, Columbia U., Jul. 2003, 93 pages.

Baugher, M., The Secure Real-time Transport Protocol (SRTP): SRTP—RFC3711: http://www.rfc-editor.org/rfc/rfc3711.txt, Cisco Systems, Inc., Mar. 2004, 50 pages.

* cited by examiner

METHOD AND APPARATUS FOR RETRIEVING AND RENDERING LIVE STREAMING DATA

BACKGROUND

The invention relates generally to the field of streaming media, and more particularly to the streaming of live media in a scalable and flexible manner.

Available bandwidth in the internet can vary widely. For mobile networks, the limited bandwidth and limited coverage, as well as wireless interference can cause large fluctuations in available bandwidth which exacerbate the naturally bursty nature of the internet. When congestion occurs, bandwidth can degrade quickly. For streaming media, which require long lived connections, being able to adapt to the changing bandwidth can be advantageous. This is especially so for streaming which requires large amounts of consistent bandwidth.

In general, interruptions in network availability where the usable bandwidth falls below a certain level for any extended period of time can result in very noticeable display artifacts or playback stoppages. Adapting to network conditions is especially important in these cases. The issue with video is that video is typically compressed using predictive differential encoding, where interdependencies between frames complicate bit rate changes. Video file formats also typically contain header information which describe frame encodings and indices; dynamically changing bit rates may cause conflicts with the existing header information. This is further complicated in live streams where the complete video is not available to generate headers from.

Frame-based solutions like RTSP/RTP solve the header problem by only sending one frame at a time. In this case, there is no need for header information to describe the surrounding frames. However RTSP/RTP solutions can result in poorer quality due to UDP frame loss and require network support for UDP firewall fixups, which may be viewed as network security risks. More recently segment-based solutions like HTTP Live Streaming allow for the use of the ubiquitous HTTP protocol which does not have the frame loss or firewall issues of RTSP/RTP, but does require that the client media player support the specified m3u8 playlist polling. For many legacy mobile devices that support RTSP, and not m3u8 playlists, a different solution is required.

SUMMARY

A method and apparatus are disclosed for delivering live content (live video and/or audio) as streaming media over the Internet to mobile devices in a device- and operator-agnostic manner. Currently, mobile video broadcasting either uses a built-in capability which is specific to a particular cell network operator or requires a device-specific application download. The disclosed technique may be used with a standard web-browser and delivered via the Internet to any mobile device in a manner that is independent of any particular cell network operator. The technique can efficiently scale horizontally to a large number of endpoints (mobile devices). In addition, a capability for automatically saving and viewing earlier segments of the stream is also provided. Overall, the disclosed method and apparatus provide the ability to deliver, in a scalable and cost-effective manner, live and time-shifted streaming of content over the Internet to mobile endpoints.

In one general respect, a disclosed system includes functions of recording, transcoding, and distributing live content or media. A recording system captures the live stream and transcodes it to various mobile device formats such as 3gpp, WMV, MOV, etc. and may dynamically segment a copy of the live stream into "chapters" for time-shifted viewing. Segments may also be used to support downloading at selectable data rates. The transcoded data is stored in a file system. A distribution subsystem provides distribution to a large number of endpoints in a highly scalable manner. In particular, a distribution tree may be employed for which the number N of endpoints is less than or equal to $F^h$, where F is the "fanout" or number of branches exiting each node and h is the height (number of levels) of the tree. Note that h grows only logarithmically in relation to N.

Client apparatus includes a rendering engine for rendering downloaded data, wherein the rendering engine communicates through a network proxy. The client apparatus performs functions including measuring bandwidth, selecting an appropriate bit rate for a current bandwidth in a delivery channel, and selecting an appropriate encoding for the client device. The client apparatus also performs the following with respect to segments of the live streaming data: (1) requesting the segments from a server, (2) downloading the segments via the delivery channel, (3) storing the downloaded segments, (4) decrypting the stored segments, (5) parsing the decrypted segments, and (6) delivering the parsed segment data to a local media player through a local network proxy.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
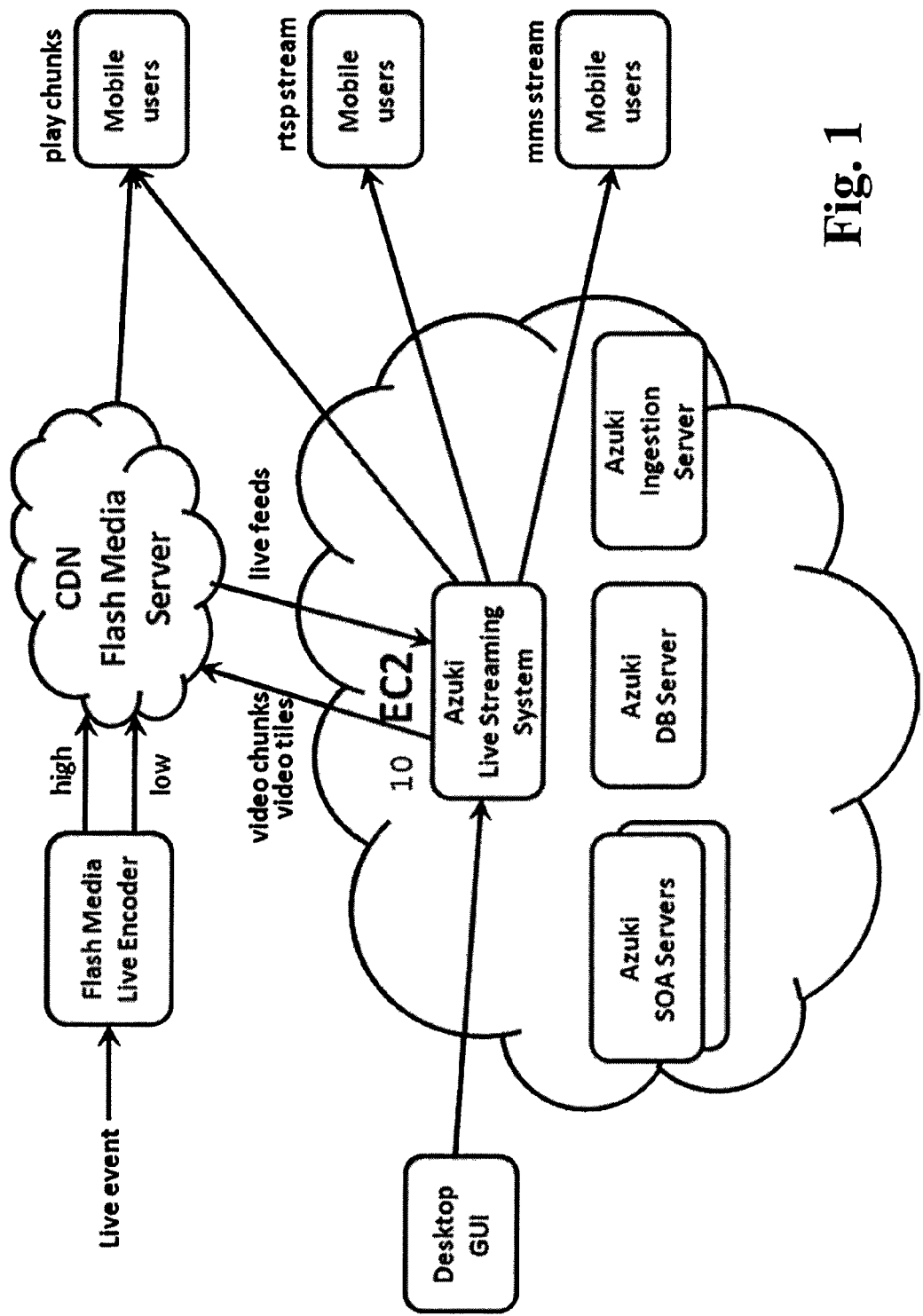
FIG. 1 is a high-level block diagram of a system for delivery of live content streams to a number of mobile devices.

A scalable live streaming system is used to deliver live event to large mobile audiences. The system generally provides mobile users with interactive and "snackable" access to the content, i.e., the ability to view selected portions of the content, along with metadata associated within a live event. The system supports the following major live streaming features:

Live Streaming

Live streaming provides real time live streaming functionality. In one embodiment, the system receives the live feed as a live stream from a content delivery network (CDN). In another embodiment, the system receives the live feed as a direct stream from an attached recording device (e.g. a webcam). The stream is recorded into a media file and re-streamed out with different encoding formats to support different mobile audiences.

Interactive Near-Live Streaming

In one embodiment, the system provides near-live interactive streaming functionality for a live feed. A mobile user can navigate the live event and play interesting video chunks in near real time while the live event is ongoing. In one embodiment, the system supports redirecting from a near live chunk to the live streaming to allow a mobile user to "tune" in the live event directly.

Server-Side Simulated Broadcast Live Streaming

This feature allows an end-user to tune in the live streaming event anywhere from the beginning of live event to near the present time.

Video on Demand

In one embodiment, the live event is recorded by the system. The recorded file can be further transcoded into multiple media formats to provide Video on Demand (VoD) replay functionality after the live event is over.

As used herein, "near-live" refers to the presence of certain latencies in the system, such as recording the live stream(s), transcoding the live media, relaying an intermediate stream, chopping into video chunks, extracting image "tiles", and transferring the video chunks to a content delivery network. The particular constituents and amounts of these delays will necessarily vary among different embodiments.

In another aspect, a disclosed system records data into segments, in a plurality of encodings in a plurality of formats, to support a plurality of heterogeneous client devices. In one embodiment, the source video is transcoded into a plurality of different bit rate encodings. The plurality of encodings are written into separate files, in segments. In one embodiment, each bit rate encoding may be stored in a plurality of file formats. Each format is written to a separate segment file. In one embodiment, the segment files adhere to a file naming convention which specifies the bit rate and format in the name, to simplify segment retrieval. The segment-based technique may be one general method by which the live stream is downloaded to the mobile endpoint devices (which are also referred to as "clients" herein).

A native client media player may be used as the rendering engine. In another embodiment, a custom rendering engine may be used. A progressive downloader can be employed to manage a data buffer. and a network proxy feeds buffered data to the rendering engine. In one embodiment, the downloader uses simple HTTP requests to retrieve complete segments as pre-segmented data files. In another embodiment, the downloader uses HTTP range GETs to retrieve segments of data from a larger file. The segments are retrieved as they become available from the live media source. In another embodiment, other legacy data retrieval methods are used, e.g. FTP. In one embodiment the downloader starts with the newest segment to provide as near to live viewing as possible. In another embodiment the downloader may start with older segments to support seeking, increase protection against network interruption or to start from a fixed point.

In one embodiment, the downloader measures network bandwidth based on the round trip download time for each segment as (S/T), where S is the size of the segment and T is the time elapsed in retrieving the segment. This includes the latency associated with each request. For video media using fixed duration segments, as available bandwidth decreases and rate adaptation is employed, the total bytes per segment will decrease. As this congestion occurs, request latency overhead increases, which helps to predict rapid downward changes in bandwidth.

In one embodiment, the downloader keeps a trailing history of B bandwidth estimates, calculating the average over the last B samples. When a new sample is taken, the Bth oldest sample is dropped and the new sample is included in the average. The following pseudocode provides an illustration:

```
integer B_index       // tail position in the circular history buffer
integer B_total       // sum of all the entries in the history buffer
integer B_count       // total number of entries in the history buffer
integer B_new         // newly sampled bandwidth measurement
integer B_old         // oldest bandwidth sample to be replaced
integer B_average     // current average bandwidth
array B_history       // circular history buffer
B_old = B_history[B_index]     // find the sample to be replaced
B_history[B_index] = B_new     // replace the sample with the new
                                  sample
B_total = B_total − B_old      // remove the old sample from the
                                  sum
B_total = B_total + B_new      // add the new sample into the sum
B_average = B_total / B_count  // update the average
B_index = (B_index + 1) %      // update the buffer index
B_count
```

The history size may be selected so as not to tax the client device. A longer history will be less sensitive to transient fluctuations, but will be less able to predict rapid decreases in bandwidth. In another embodiment the downloader keeps only a single sample and uses a dampening filter for statistical correlation. The following provides illustrative pseudocode:

```
integer B_new        // newly sampled bandwidth measurement
integer B_average    // current average bandwidth
float B_weight       // weight of new samples, between 0 and 1
B_average = (B_average * (1 − B_weight)) +
(B_average * B_weight) // update the average
```

This method may require less memory and fewer calculations. It can also allow for exponential drop off in historical weighting.

In one embodiment, download progress for a given segment is monitored periodically so that the segment size S of the retrieved data does not impact the rate at which bandwidth measurements are taken. There are numerous methods for estimating bandwidth, as should be known to those skilled in the art; the above are representative of the types of schemes possible but do not encompass an exhaustive list of schemes. Other bandwidth measurement techniques as applicable to the observed traffic patterns are acceptable within the context of the present invention.

In one embodiment, bandwidth measurements are used to determine when a change in bit rate is required. If the estimated bandwidth falls below a given threshold for the current encoding, for a specified amount of time, then a lower bit rate encoding should be selected. Likewise if the estimated bandwidth rises above a different threshold for the current encoding, for a different specified amount of time, then a higher bit rate encoding may be selected. The rate change takes place at the download of the next segment.

Description of Illustrative Embodiments

FIG. 1 shows a block diagram of a live media streaming environment which includes mobile users and a "mash media platform" residing in an elastic compute cloud (EC2). A live media stream (e.g., of a live event) is generated by a live media source. A live streaming system 10 receives the live event media stream from a content delivery network (CDN) and delivers corresponding live media streams and interactive "near-live" streams to mobile audiences. Various formats of incoming live streams can be supported, including Flash format.

The live streaming system provides the following functionality:

Control live streaming system starting and stopping.
Interface with external live feed.
Record the live stream(s) into local media file(s).
Transcode recorded file into different encoding formats supported by the system.
Chop recorded media file into video chunks with predefined chunk duration.
Extract image tiles from the recorded media file with predefined tile interval.
Upload the video chunks to CDN in real time.
Support existing user interaction functionality for the live event.
Support RTSP and MMS streaming for mobile devices.
Create metadata associated with the live event.
Create server-side playlist and SDP files for simulated server side live broadcasting.

The live streaming system is designed to be flexible and easily expandable to support large mobile audiences.

Figure 2:
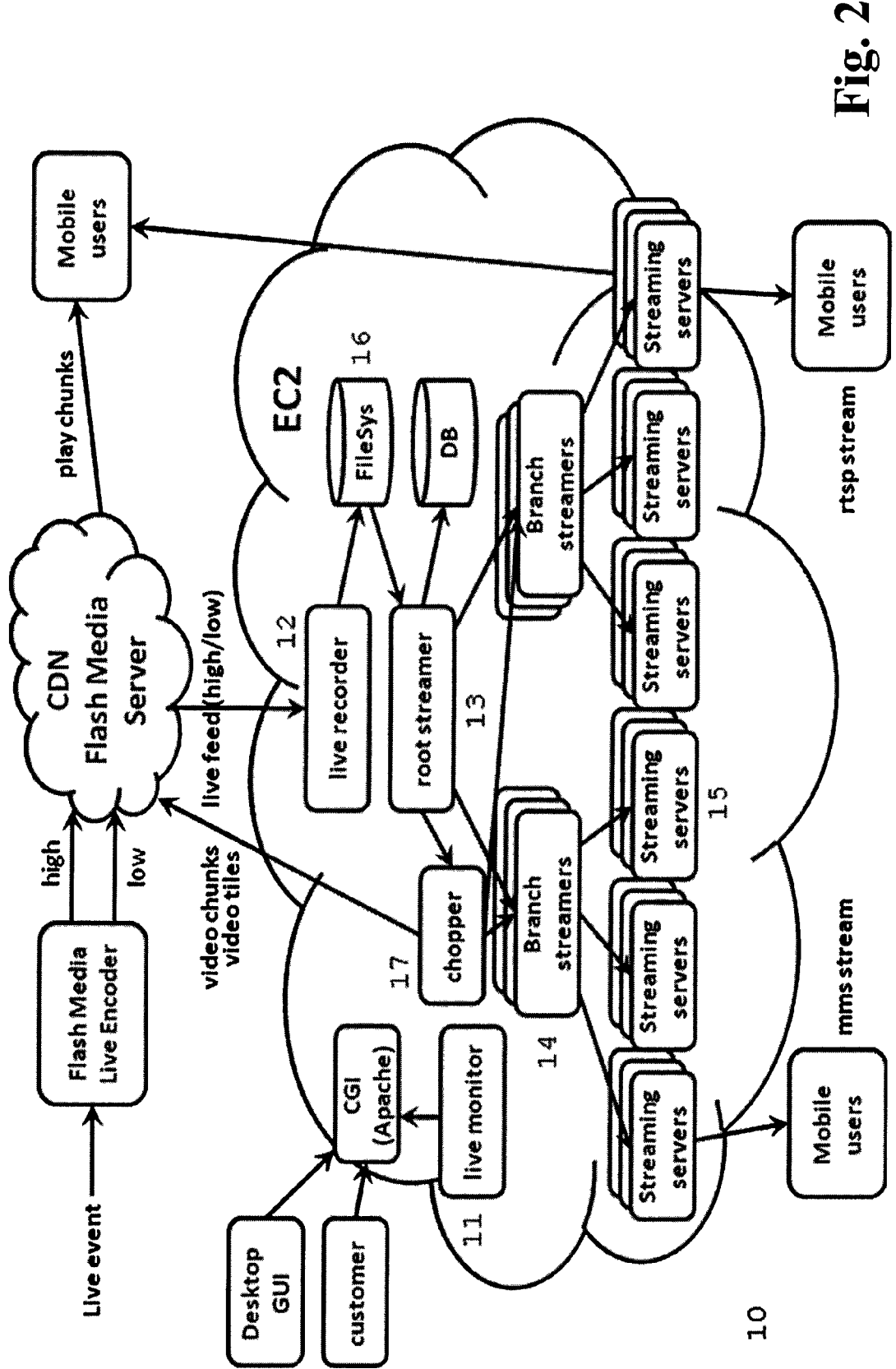
FIG. 2 is a block diagram of the system of FIG. 1 showing detail of a live streaming system component.

FIG. 2 shows the overview of the live streaming system 10. The system includes a Live Streaming Monitor 11 (shown as "live monitor"), a Live Streaming Recorder 12 ("live recorder"), Root Streamer 13, Branch Streamers 14, and Streaming Servers 15. These are now described in turn. It will be appreciated that these components may correspond to software being executed by one or a collection of computerized devices, as that term is more fully defined below.

Live Streaming Monitor and Control

The live streaming monitor 11 consists of scripts running in the background to monitor incoming stream properties, the status of an RTMP connection, and the status of the Root Streamer 13 and Branch Streamers 14. Additionally, a Web-based interface is provided in the system to be used by a customer to send stream properties before the live event starts or end of the live event. In one embodiment, the Web-based interface is implemented as a CGI script. In another embodiment, the Web-based interface is implemented as a RESTful Web Service. A desktop GUI may be provided to control the live streaming server by calling the Web-based interface. An example CGI interface may be the following:

http://<hostname>/cgi-bin/
ags.cgi?event=<name>&id=<event
id>&status=<on|off> where a customer provides the following parameters:
event: stream name
id: event ID
status: event status (ON or OFF)

These scripts control the whole live streaming system to start, stop, and terminate automatically based on stream properties and network connection status. A system administrator can also control the system through GUI.

Live Streaming Recorder

In one embodiment, the Live Stream Recorder 12 is used to capture a live stream via the RTMP protocol and save the stream into a local file. In another embodiment, the Live Stream Recorder 12 is used to capture a live stream via the MMS protocol and save the stream to a local file. In another embodiment, the Live Stream Recorder 12 is used to capture a live stream via the RTP protocol and save the stream to a local file. The local file can be one of a number of valid container formats (e.g. FLV, MP4, 3GP, MOV, WMV, etc.) which should be known to those skilled in the art. The local file is then transcoded and streamed out through the Streaming Tree (described below). The Live Stream Recorder 12 is also responsible for notifying the Live Stream Monitor of streaming protocol specific events which affect the state of the stream (e.g. stream start, stream stop, and stream errors).

Video on Demand

The live event is recorded by the Live Streaming Recorder 12 into a recorded media file. This media file can be further transcoded into multiple transcoded media files in different formats. These transcoded media files can be used by the system to provide Video on Demand (VoD) functionality after the live event is over.

Live Event Metadata and Database (Shown as "DB" in FIG. 2)

While a live event is ongoing, multiple metadata associated with the live event are created and stored in the central database 16. These metadata can be used to describe the properties of each specific live event. By using these metadata entries in the database, each live event is searchable.

Streaming Tree

A Streaming Tree contains at least one Root Streamer 13 and multiple Streaming Servers 15. One or more intermediate Branch Streamers 14 are generally also employed, although for sufficiently small audiences it may be possible for the Root Streamer 13 to provide its streams directly to Streaming Servers 15. Each Streaming Tree is used to deliver one live event. The Branch Streamers 14 and Streaming Server 15 receive streams from their parents and replicate the stream to multiple children. Within one Streaming Tree, more Branch Streamers 14 and Streaming Servers 15 can be added into the Streaming Tree to accommodate the mobile audience scale. A Streaming Tree is one specific type of stream distribution subsystem. For VoD or chunk content, the Streaming Tree may function more as a hierarchical caching infrastructure with push-based distribution of live recorded files. In one embodiment, Streaming Tree distribution is performed by unicast connections between parents and children. In another embodiment, Streaming Tree distribution is performed via IP multicast.

Multiple Live Events

The system can be easily expanded to support concurrent live events. The system can be configured to have multiple Streaming Trees each delivering a different live event. Multiple Streaming Trees may also be used to provide different encodings of a single live event. For VoD or chunk content, a single distribution tree may be used to support multiple encoding or live events.

Encoding Parameters Configuration

When a live event is starting, a set of encoding parameters, such as, video format, video bit rate, audio format, audio bit rate, frame rate, etc., can be configured to deliver specific streams to mobile audiences based on targeted mobile phones and wireless network bandwidth. These encoding parameters have been configured to support various mobile phones and wireless carrier networks.

Load Balancing

The system can provide load balancing functionality to deliver the live stream to mobile users. The plurality of Streaming Servers 15 may be distributed across multiple data centers, in which case DNS load balancing may be used to map the closest data center. Within a single data center, the plurality of Streaming Servers 15 may also be load balanced by a server load balancer to distribute load.

Live Streaming Navigation

The system may enable a user to watch a live event in two different ways. One is to watch the real time live event in the normal linear fashion (beginning to end). Another way is to allow the user to navigate into the live event to find interesting points and watch "snackable" portions or clips. These snackable clips are produced by the Live Streaming Chopper (see below) dynamically while the live event is ongoing.

Root Streamer

The Root Streamer 13 is the streaming source of the live streaming system. It transcodes the recorded 1 file and streams out multiple streams to either the intermediate Branch Streamers 14 or the Streaming Servers 15 directly. In one embodiment, the Root Streamer 13 uses RTP streams to distribute live content. The Root Streamer 13 also streams the live content to the chopper 17. The Root Streamer 13 also sets the event metadata to database so that the GUI can display the event status to mobile audiences.

There may be multiple Root Streamers 13 in the system in case of supporting multiple live streaming channels or multiple live stream encodings for one customer or many customers. By supporting multiple Root Streamers 13 and intermediate Branch Streamers 14, the system can support multiple customers and expand to support large audiences.

Branch Streamer

The Branch Streamer 14 is the intermediate streamer in the system. It takes the incoming RTP stream and relays the stream to a next level of the Branch Streamers 14 or to the Streaming Servers 15. The Branch Streamers 14 are used to expand the system to support large mobile audiences.

Streaming Server

The Streaming Servers 15 are the front end of the live streaming system to deliver the stream(s) to mobile audiences. They receive the streams from the Root Streamer 13 or Branch Streamers 14 and relay the streams to mobile audiences to watch the live event. The system may support a variety of streaming protocols, including but not limited to HTTP Live Streaming, RTSP and MMS. The number of Streaming Servers 15 used will generally depend on how many concurrent clients are supported by the live streaming system. Additional Streaming Servers 15 may also be used to provide physical distribution over a wider geographical area. Increasing distribution allows for lower latency when streaming to mobile clients in a specific region. The streams delivered to the client devices by the Streaming Servers are referred to as "distributed streams".

Live Streaming Chopper

The Live Streaming Chopper 17 is used for the interactive Near-Live Streaming. It receives the stream from Root Streamer 13, transcodes and saves the stream to many N-minute video chunks, chops the N-minute video chunks into smaller video chunks based on a default definition file and extracts image tiles. In one embodiment, the Chopper 17 uploads chunks and tiles to a CDN for distribution to clients. In another embodiment, the Chopper 17 uses the Streaming Tree as a distribution path for video chunks. In one embodiment the chunks are distributed using reliable multicast to the Branch Streamers (or proxy caches in this case) 14, through to the Streaming Servers 15. In one embodiment, the user can play the snackable chunks through an interactive GUI such as described in PCT patent application PCT/US09/32565 entitled "Media Navigation System", published Aug. 6, 2009 as WO/2009/097492. In another embodiment, the user can play the chunks using an HTTP Live Streaming compatible media player. In another embodiment, the user can play the chunks using a method in accordance with various provisions of this invention.

Figure 3:
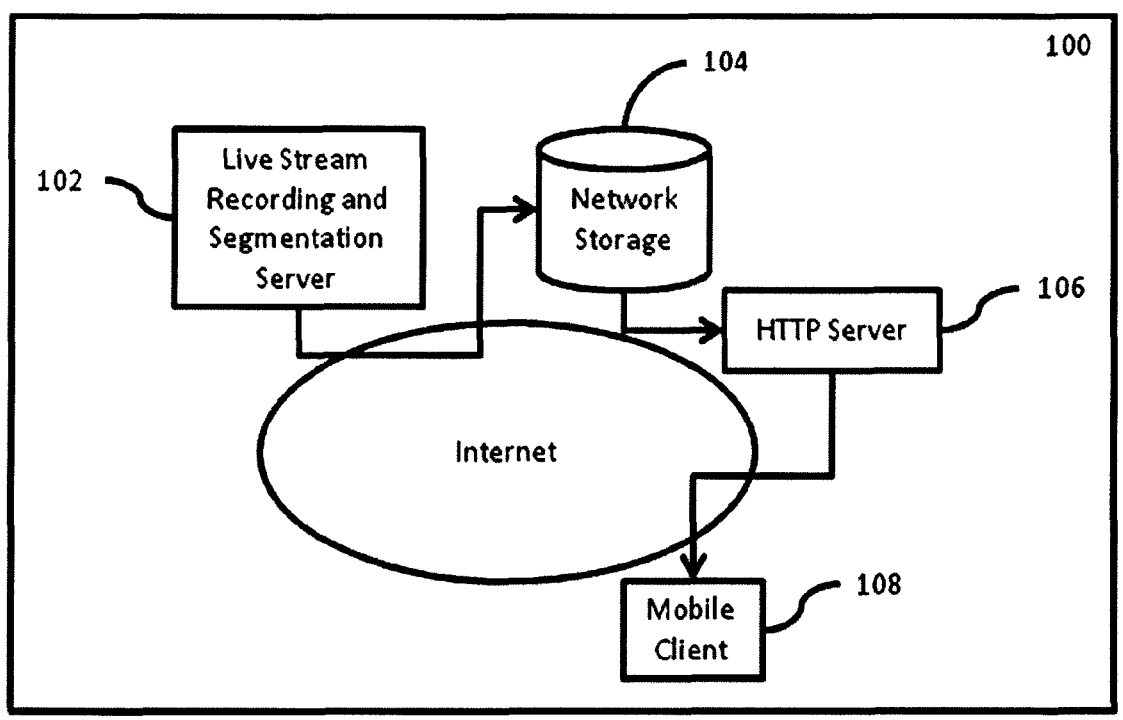
FIG. 3 is a block diagram of a system which is capable of conducting procedures, in accordance with various embodiments of the invention.

FIG. 3 is a block diagram 100 for one embodiment of the present invention. It shows the client device 108 and live stream recording and segmentation (R/S) server 102 (which is referred to as "Live Stream Recorder" above). The R/S server 102 and client 108 are both typically computerized devices which include one or more processors, memory, storage (e.g., magnetic or flash memory storage), and input/output circuitry all coupled together by one or more data buses, along with program instructions which are executed by the processor out of the memory to perform certain functions which are described herein. Part or all of the functions may be depicted by corresponding blocks in the drawings, and these should be understood to cover a computerized device programmed to perform the identified function.

The client 108 connects to a standard HTTP server 106 to retrieve segments. The segments are stored on a storage device 104. The storage may be local or remote and may use any of a number of storage technologies, as should be known to those skilled in the art. The segments are generated by the R/S server 102. The R/S server 102 is responsible for recording the live stream and transcoding it into a plurality of encodings, where each encoding uses a different bit rate. In one embodiment, default encoding parameters are provided in a configuration file. In another embodiment, default encoding parameters are provided at invocation. In one embodiment, individual source files may override default encoding parameters via an accompanying configuration file. In another embodiment, individual source files may override default encoding parameters using parameters provided at invocation. The R/S server 102 writes the transcoded data into segments then uploads the segments to the storage device 104. In one embodiment the recoding and segmentation may be invoked manually. In another embodiment, the recording and segmentation may be asynchronously invoked programmatically, based on pre-scheduled live events. The R/S server 102 is also responsible for segment encryption. In one embodiment, segments are encrypted before being uploaded to the storage device 104.

Figure 4:
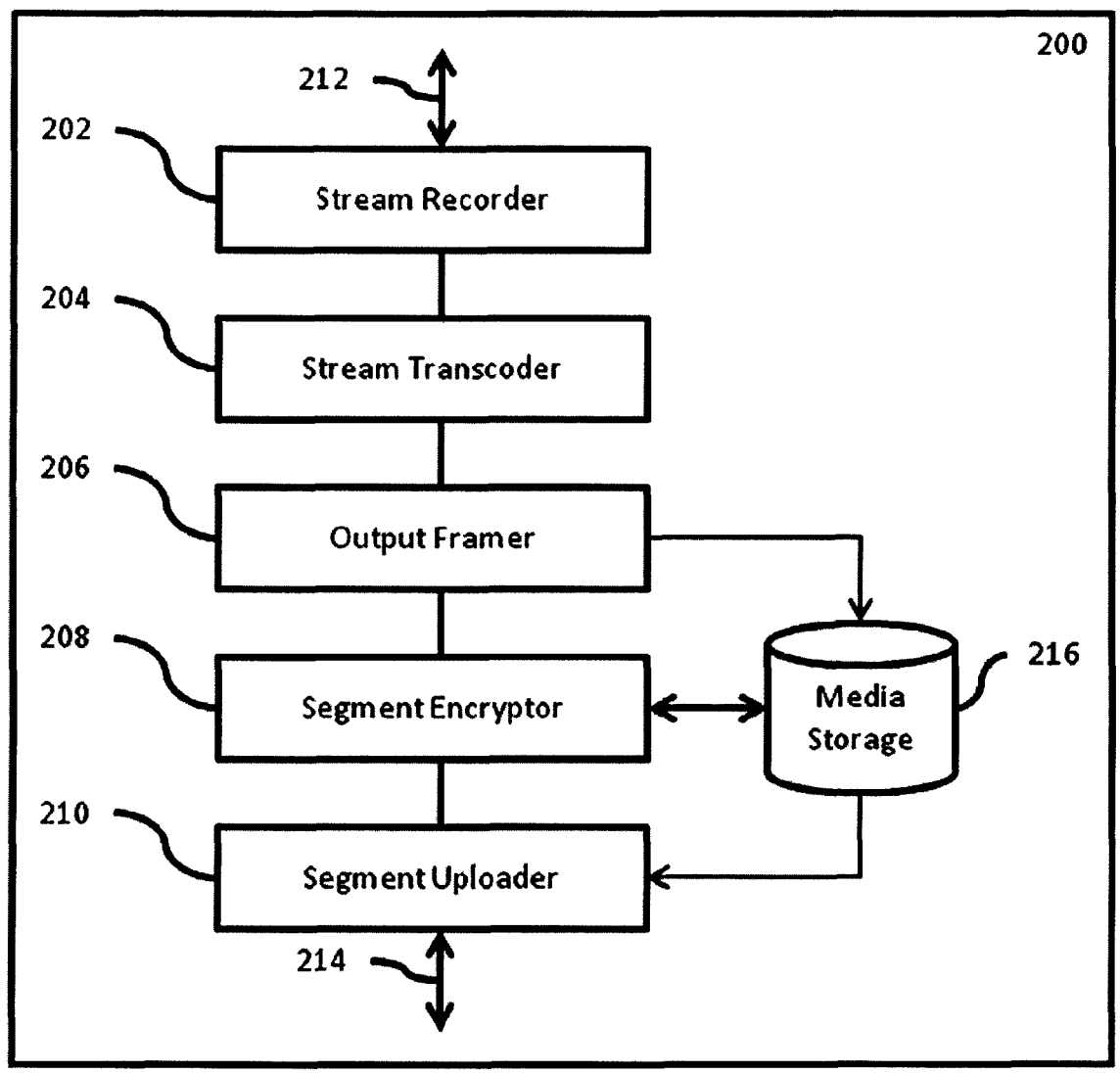
FIG. 4 is a diagram of a live stream recording and segmentation server, in accordance with various embodiments of the present invention.

FIG. 4 is a diagram 200 of the components of the R/S server 102. The live stream 212 is recorded by the stream recorder 202. The stream recorder 202 implements the specific protocol required to connect to the live stream 212. In one embodiment the protocol is RTMP. In another embodiment the protocol is RTSP/RTP. In another embodiment, the protocol is HTTP Live Streaming. In another embodiment, the protocol is MMS. There are numerous live streaming protocols, as should be known to those skilled in the art, of which any would be suitable for the stream recorder 202.

The stream recorder 202 passes recorded data to a stream transcoder 204 as it is received. The stream transcoder 204 is responsible for decoding the input stream and re-encoding the output video frames in the proper output codecs. The stream transcoder 204 passes the re-encoded frames to the output framer 206. The output framer 206 is responsible for packing the encoded frames into the proper container format. In one embodiment, the stream transcoder 204 and output framer 206 support the H.264, H263, MPEG2, MPEG4, and WVM, video codecs and the MP3, AAC, AMR, and WMA audio codecs, along with the FLV, MOV, 3GP, MPEG2-TS and ASF container formats. In another embodiment, the stream transcoder 204 and output framer 206 may support other standard or proprietary codecs and container formats. There are numerous video and audio codecs and container formats, as should be known to those skilled in the art, of which any would be suitable for the stream transcoder 204 and output framer 206. In one embodiment, the output framer 206 also supports the proprietary container format shown in FIG. 5 and discussed below.

The output framer 206 writes the formatted data into segment files in the media storage 216. The output framer 206 is responsible for enforcing segment boundaries and durations. When the segments are complete, the output framer 206 notifies the segment encryptor 208. If segment encryption is required, the segment encryptor 208 reads the segment from the media storage 216, encrypts the segment, writes the encrypted segment back out to the media storage 216, and notifies the segment uploader 210 that the segment is ready for upload to the storage device 104. If no encryption is required, the segment encryptor 208 just notifies the segment uploader 210 that the segment is ready for upload to the storage device 104.

The segment uploader 210 uploads the finished segments to the storage device 104 (FIG. 3). In one embodiment, the segment uploader 210 uses HTTP to upload segments. In another embodiment, segment uploader 210 uses FTP to upload segments. In another embodiment, segment uploader 210 uses SCP to upload segments. In another embodiment, segment uploader 210 uses simple file copy to upload segments. There are numerous methods, with varying levels of security, which may be used to upload the files, as should be known to those skilled in the art, of which any would be suitable for the segment uploader 210.

Figure 5:
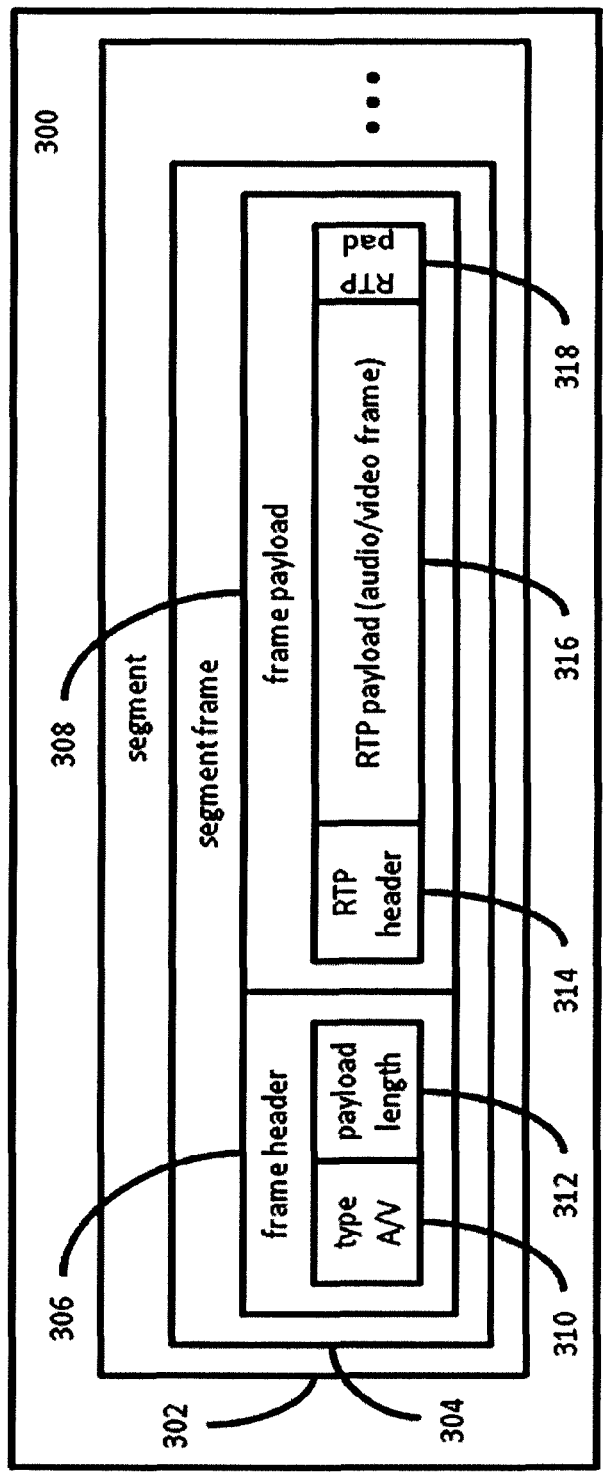
FIG. 5 is a diagram of a segment file format, in accordance with an embodiment of the present invention.

FIG. 5 is a diagram 300 of a segment format which may be used in accordance with an embodiment of the present invention. The segment 302 contains a plurality of segment frames 304. Each segment frame 304 consists of a frame header 306 and a frame payload 308. The frame header 306 contains frame type information 310 and frame payload length information 312. In one embodiment, the frame type information 310 indicates the payload track information (audio vs. video) as well as any additional information about the payload framing. The frame payload length 312 indicates the length of the segment frame payload 308 section. The frame payload length 312 may be used to parse the segment sequentially, without the need for global index headers and metadata to be packed at the beginning of the segment. In one embodiment, the frame header 306 is aligned to 4 or 8 byte boundaries to optimize copying of the frame payload 308.

The frame payload 308 contains further video frame encapsulation. In one embodiment, the encapsulation may be the further frame encapsulation may be for the RTP protocol. In another embodiment, the further frame encapsulation may be for the RTMP protocol. There are numerous video delivery protocols with different frame encapsulation formats, as should be known to those skilled in the art, which would be suitable for inclusion in the frame payload 308. In diagram 300, the further frame encapsulation shown is for the RTP protocol. The video frame is further encapsulated by the RTP packet header 314. The RTP payload 316 contains the actual video frame plus RTP padding 318. In one embodiment, RTP protocol padding 318 is used to pad the RTP payload 316 out to a 4 or 8 byte boundary, to ensure that the frame header 306 is 4 or 8 byte aligned, respectively. In another embodiment, custom padding may be added, outside of the protocol-specific frame encapsulation.

Figure 6:
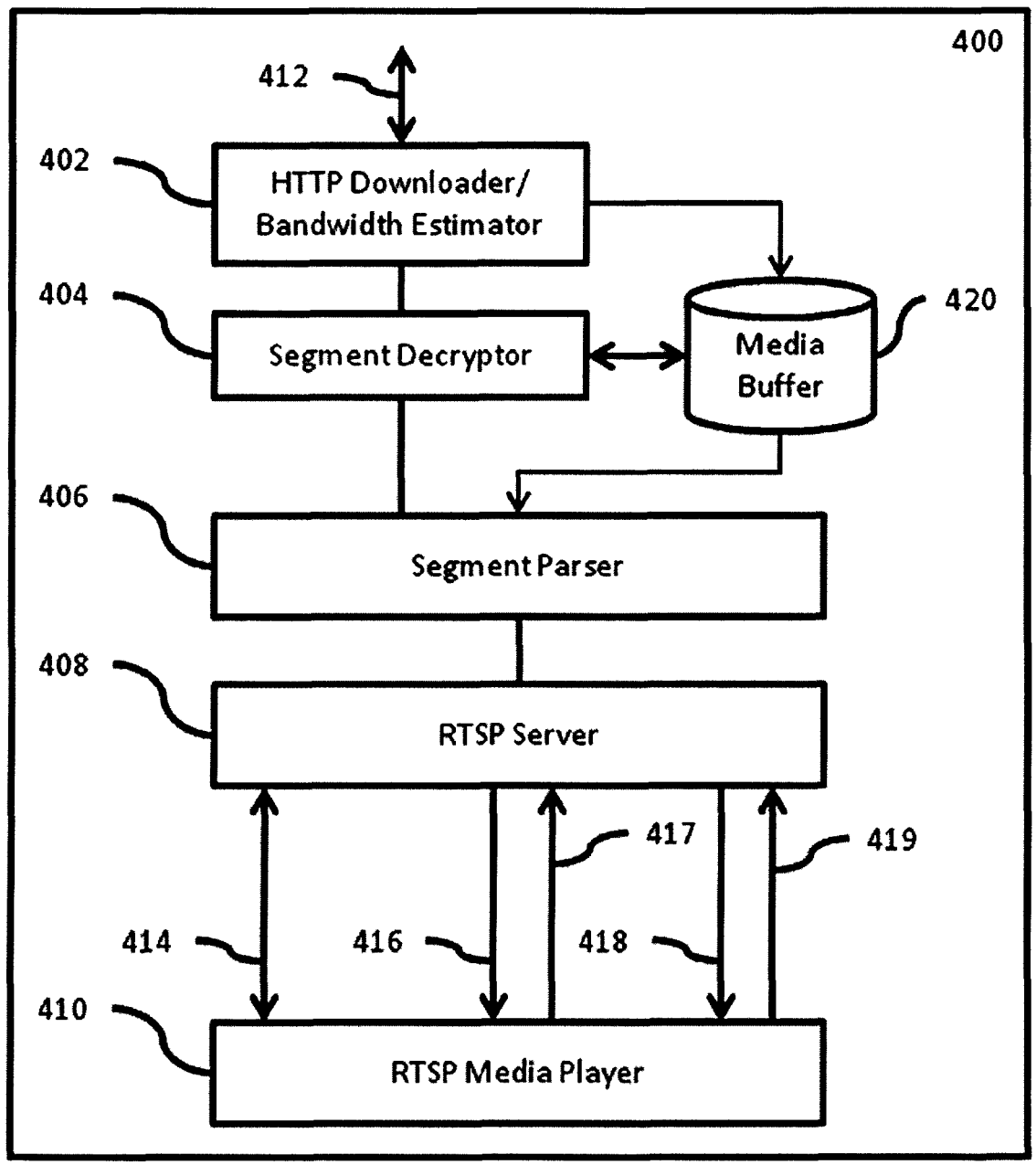
FIG. 6 is a diagram of a native RTSP live streaming client capable of viewing live segments, in accordance with an embodiment of the present invention.

FIG. 6 is a diagram 400 of a client device, wherein the client device native media player 410 supports RTSP/RTP for live streaming, which has been modified to support segment based live streaming, in accordance with an embodiment of the present invention.

In one embodiment, the client contains a downloader 402. The downloader 402 is responsible for interacting with the HTTP server 106 (FIG. 3) to retrieve segments from the network storage device 104. The segments retrieved are written into the media buffer 420 and the downloader 402 notifies the segment decryptor 404. If the segment does not require decryption, the segment decryptor 404 notifies the segment parser 406 that the segment is ready. If the segment does require decryption, the segment decryptor 404 reads the segment from the media buffer 420, decrypts the segment, writes the decrypted segment back out to the media buffer 420, and notifies the segment parser 406 that the segment is ready.

RTSP requires separate frame based delivery for audio and video tracks. The RTP segments retrieved use the format 300 detailed in FIG. 5. The segments are parsed by the segment parser 406 to extract the individual audio and video RTP frames 308. The RTP frames 308 are already encapsulated for RTP simplifying the RTSP server 408. Once all the RTP frames 308 have been extracted and handed off to the RTSP server 408, the segment is no longer required. In one embodiment, the segment parser 406 removes the segment from the media buffer 420 once it has been completely parsed. In another embodiment, the segment parser 406 does not purge segments until the media buffer 420 is full. The RTSP server 408 handles requests from the media player 410 on the RTSP control channel 414, and manages setting up the audio and video RTP channels 416 and 418, and the audio and video RTCP channels 417 and 419. The audio and video RTP frames 308 are sent in a paced manner, by the RTSP server 408 on their respective RTP channels 416 and 418.

Figure 7:
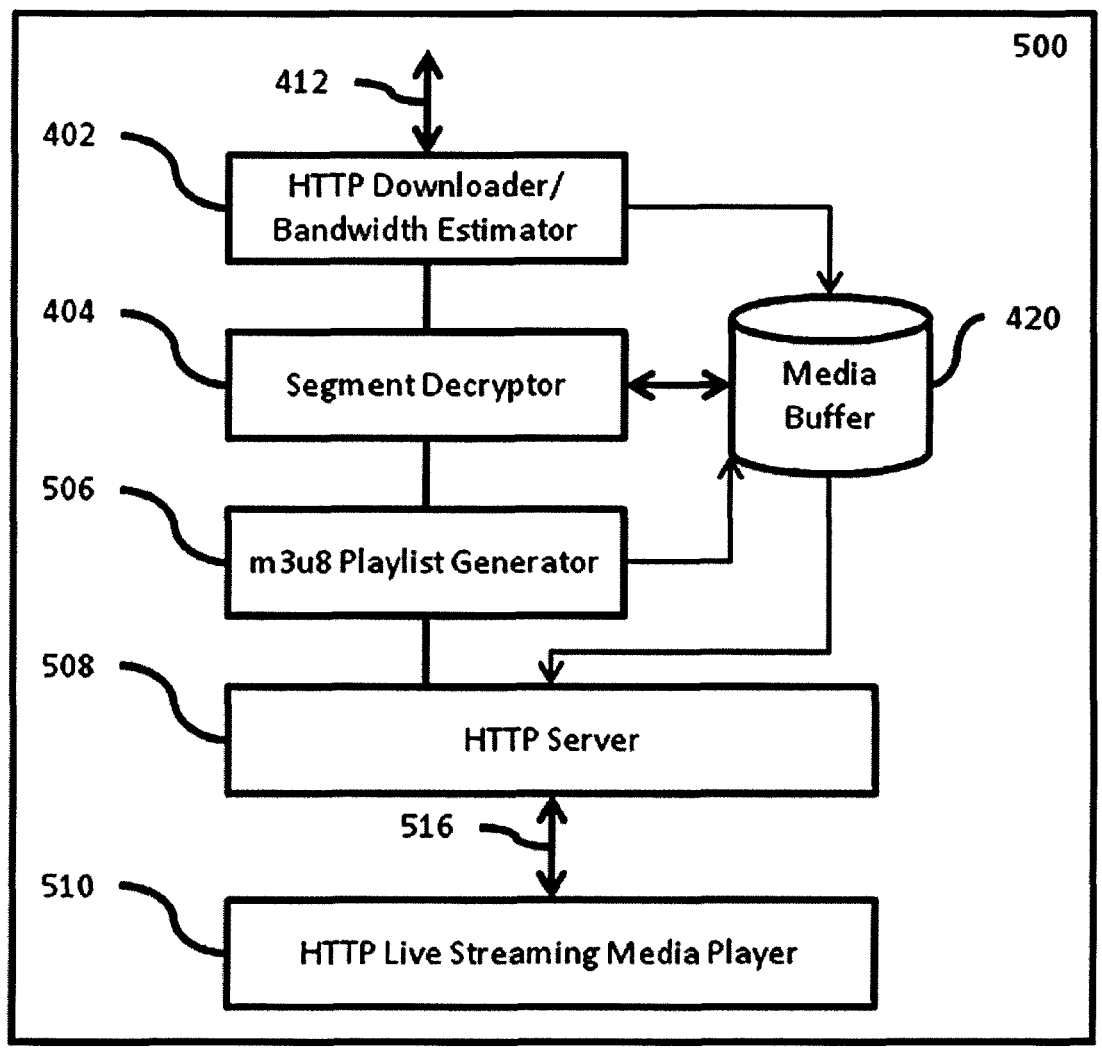
FIG. 7 is a diagram of a native HTTP live streaming client capable of viewing live segments, in accordance with an embodiment of the present invention.

FIG. 7 is a diagram 500 of a client device, wherein the client device native media player 510 supports HTTP Live Streaming, which has been modified to support segment based live streaming, in accordance with an embodiment of the present invention.

In one embodiment, the client contains a downloader 402. The downloader 402 is responsible for interacting with the HTTP server 106 (FIG. 3) to retrieve segments. The segments retrieved are written into the media buffer 420 and the downloader 402 notifies the segment decryptor 404. If the segment does not require decryption, the segment decryptor 404 notifies the playlist generator 506 that the segment is ready. If the segment does require decryption, the segment decryptor 404 reads the segment from the media buffer 420, decrypts the segment, writes the decrypted segment back out to the media buffer 420, and notifies the playlist generator 506 that the segment is ready.

In the case of the HTTP Live Streaming client, MPEG2-TS format segments are retrieved. HTTP Live Streaming supports direct download of segments, as pointed to by an m3u8 playlist file. The playlist generator 506 is passed the file location, in the media buffer, by the segment decryptor 404. The playlist generator 506 updates the existing playlist adding the new segment and removing the oldest segment and passes the updated playlist to the HTTP server 508. The playlist generator 506 is also responsible for purging old segments from the media buffer 420. In one embodiment, segments are purged from the media buffer 420 as segments are removed from the playlist. In another embodiment, segments are only purged once the media buffer 420 is full, to support the largest possible rewind buffer.

The HTTP server 508 responds to playlist polling requests from the media player 510 with the current playlist provided by the playlist generator 506. The HTTP server 508 responds to segment requests from the media player 510 by retrieving the segment from the media buffer 420 and delivering it to the media player 510. The media player 510 connects to the HTTP server 508 though a local host HTTP connection 516.

For the clients in both FIG. 6 and FIG. 7, the downloader 402 is also responsible for calculating average available bandwidth. In one embodiment, the downloader 402 calculates the available bandwidth based on download time and size of each segment retrieved. In one embodiment, bit rate switching is initiated when the average available bandwidth falls below the current encoding's bit rate:

```
int bandwidth_avg      // average available network bandwidth
int video_bit_rate     // current video encoding bit rate
if bandwidth_avg < video_bit_rate
    for each encoding sorted by bit rate in descending order
        if encoding.bit_rate < bandwidth_avg && encoding.bit_rate !=
        video_bit_rate
            change encoding
            break
        end
    end
end
```

The above can also be stated as, a bit rate switch is initiated when the download time required for a segment exceeds the duration of the segment. In one embodiment, a multiplier, less than one, is applied to detect network underruns before they occur:

```
int bandwidth_avg           // average available network bandwidth
int video_bit_rate          // current video encoding bit rate
int segment_download_time   // time to download most recent
                               segment
int segment_duration        // duration of most recent segment
int multiplier              // multiplier less than 1
if segment_download_time > segment_duration * multiplier
    for each encoding sorted by bit rate in descending order
        if encoding.bit_rate < bandwidth_avg && encoding.bit_rate !=
        video_bit_rate
            change encoding
            break
        end
    end
end
```

In this scheme, the average network bandwidth is unable to sustain the video playout rate and a playback stoppage is imminent once the buffer runs out. This scheme requires relatively few calculations to determine when to switch encodings. However, it also has relatively low capability for predicting when a stoppage will occur. The encoding to switch to is the next lowest bit rate encoding whose bit rate is less than the average network bandwidth. Switching encodings to one of higher bit rate is initiated when the buffer occupancy of the media buffer 420 has reached its capacity and the average bandwidth exceeds the encoding bit rate of another encoding:

```
int bandwidth_avg      // average available network bandwidth
int video_bit_rate     // current video encoding bit rate
int buffer_occupancy   // seconds of video currently in the buffer
int buffer_capacity    // seconds of video the buffer can hold
if bandwidth_avg > video_bit_rate && buffer_occupancy >=
buffer_capacity
    for each encoding sorted by bit rate in descending order
        if encoding.bit_rate < bandwidth_avg && encoding.bit_rate !=
        video_bit_rate
            change encoding
            break
        end
    end
end
```

The encoding to switch to is the highest bit rate encoding whose bit rate is less than the average network bandwidth. This is an optimistic approach which assumes no further degradation in bit rate and works well when connected to a reliable, high bandwidth network. In another embodiment predictive bandwidth schemes may also be used to optimize rate adaptation for other environments.

Figure 8:
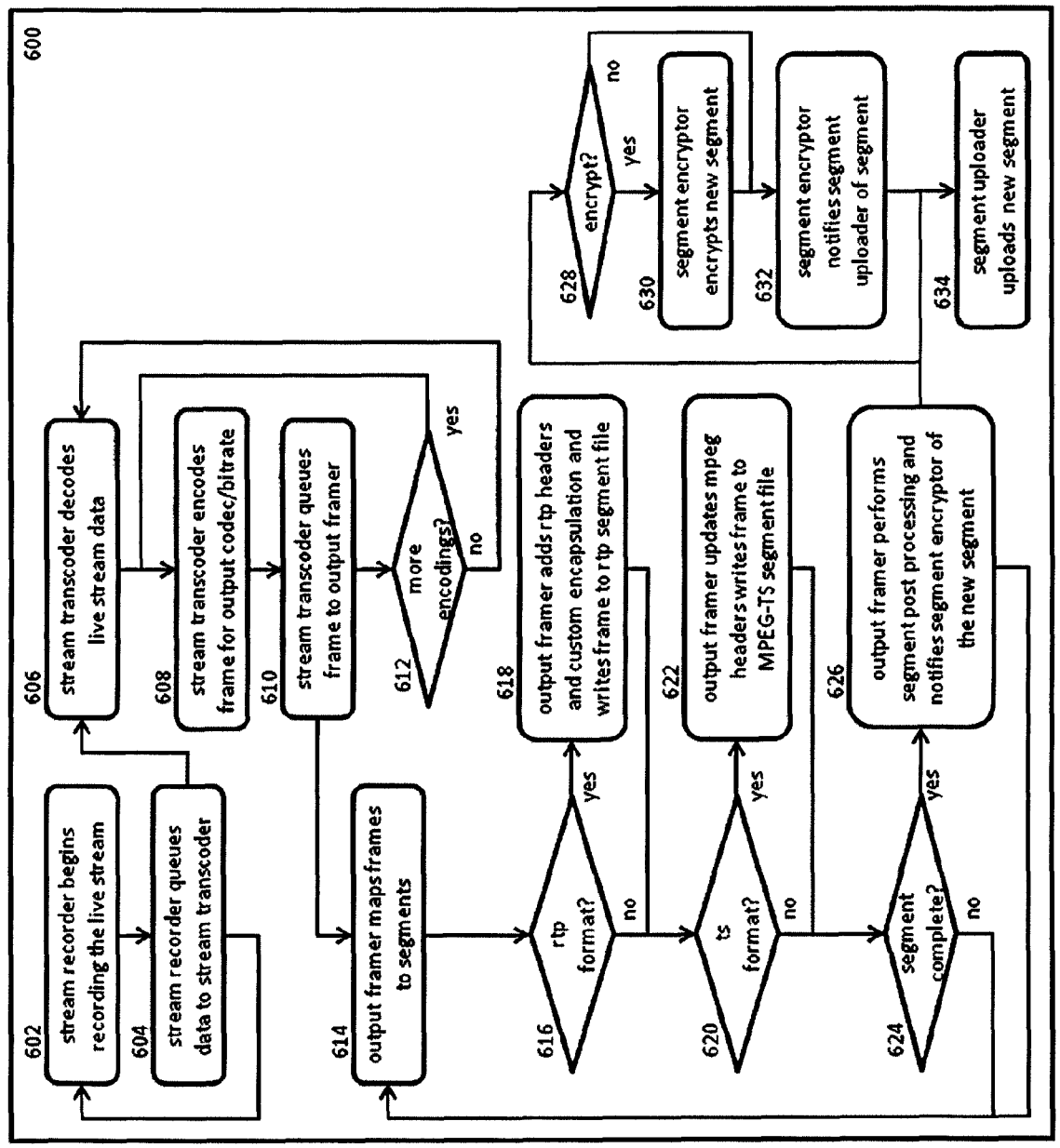
FIG. 8 is a flow chart showing a method for performing live stream segmentation, in accordance with various embodiments of the invention.
Figure 9:
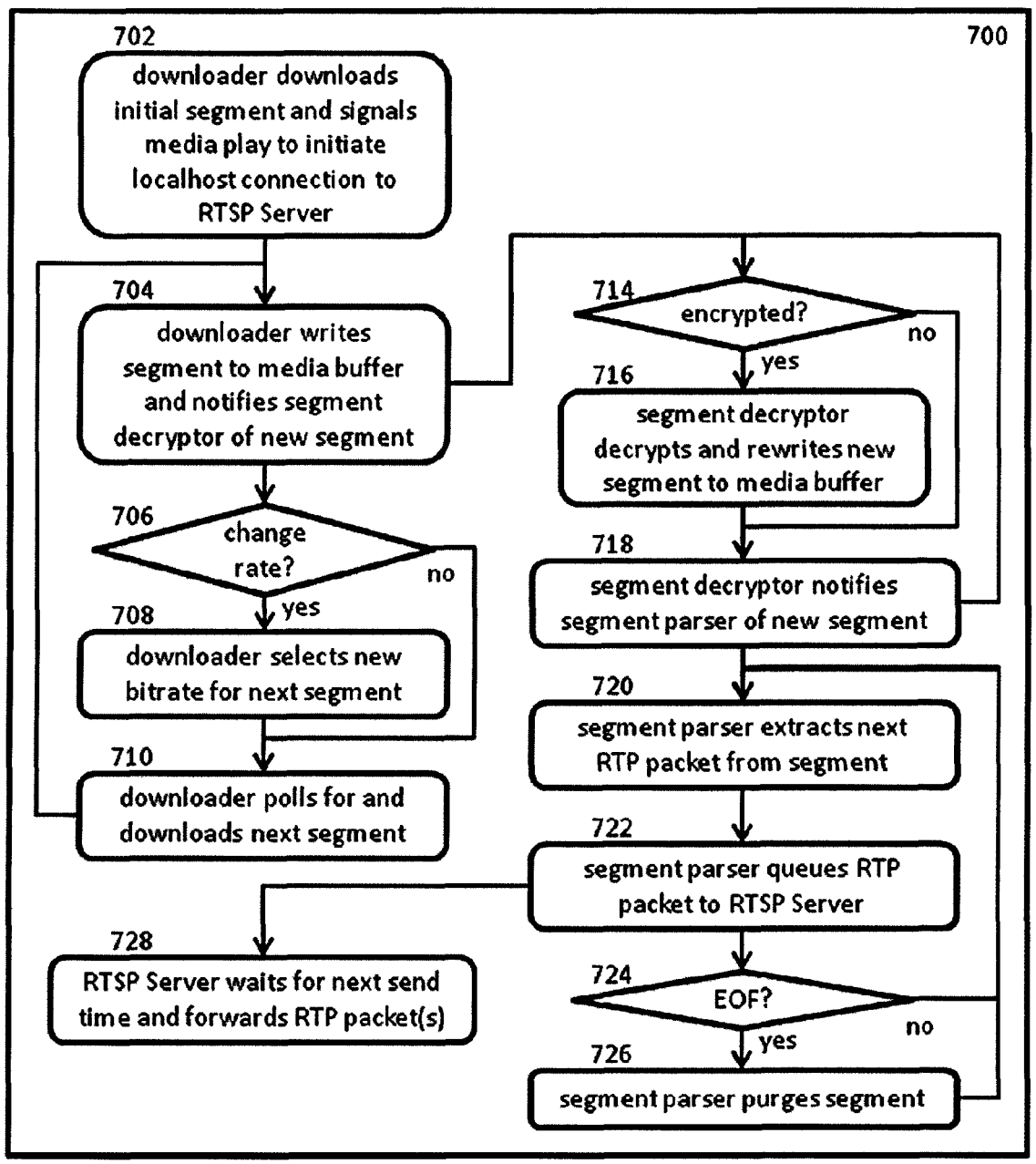
FIG. 9 is a flow chart showing a method for performing live stream segment retrieval and decoding, in accordance with an embodiment of the present invention.
Figure 10:
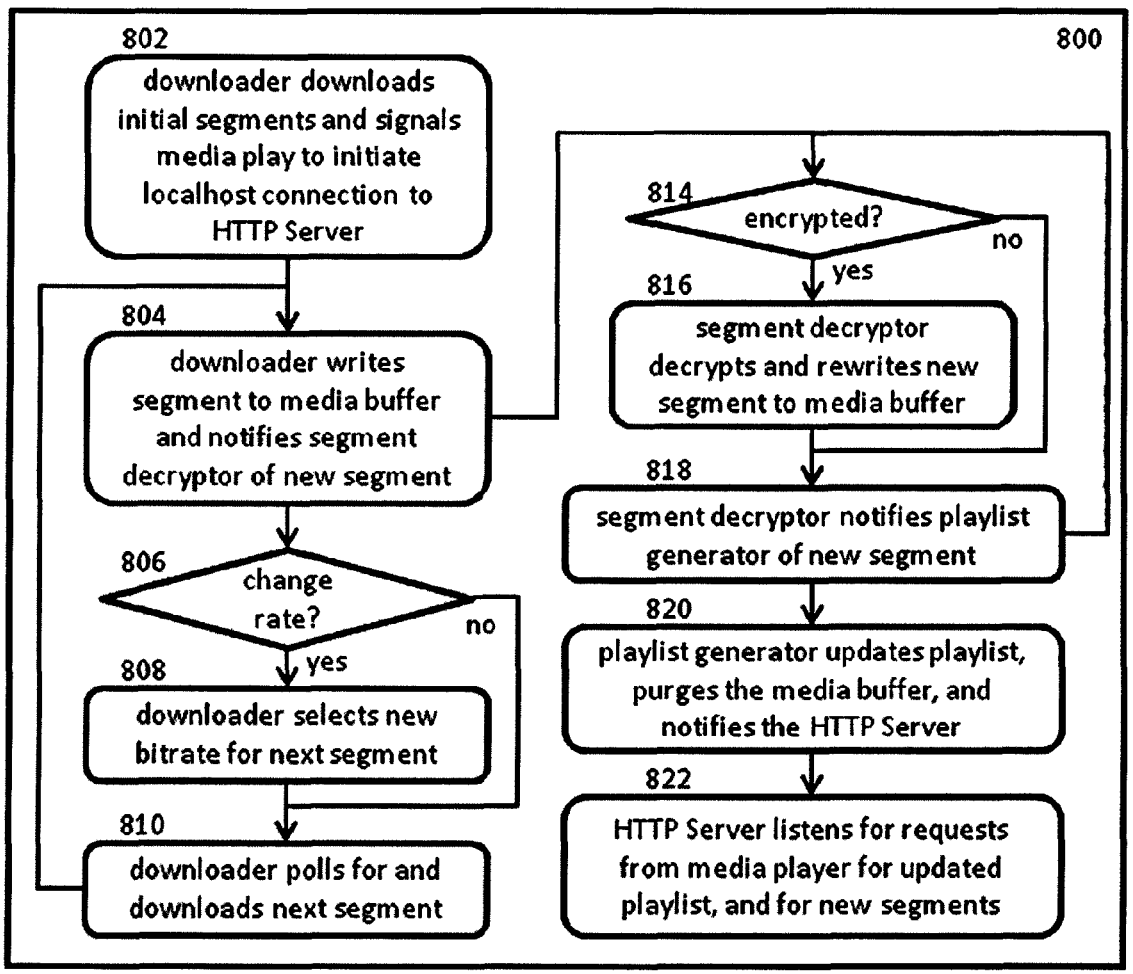
FIG. 10 is a flow chart showing a method for performing live stream segment retrieval and decoding, in accordance with another embodiment of the present invention.

FIGS. 8-10 are flow charts depicting various operations, and each is described in turn below. In these Figures, reference is made to various components of the system which are performing various steps of the operations. These components are shown in FIGS. 3-7 and are referred to below by the same reference numbers.

FIG. 8 is a flow chart 600 describing the process of recording a live stream and creating the segments required for use in accordance with various embodiments of the present invention. In step 602, the stream recorder 202 begins retrieving and recording the live stream. In one embodiment, the live stream is delivered via a live streaming protocol such as RTMP, RTP, or Silverlight Smooth Streaming. In another embodiment, the live stream may be delivered via a near real-time streaming protocol such as HTTP Live Streaming. In another embodiment, the live stream may be read from pre-recorded video files. The stream recorder 202 buffers data in memory, and periodically writes the data to the stream transcoder 204, in step 604. The stream recorder 202 performs steps 602 and 604 in a continuous loop, for the duration of the live stream.

The stream transcoder 204 processing begins in step 606, once data has been queued by the stream recorder 202. In step 606, the stream transcoder 204 starts by decoding individual frames from the recorded data. In step 608, the stream transcoder 204 re-encodes each frame based on the output configuration. In step 610, the stream transcoder 204 passes the encoded frame to the output framer 206. In step 612, the stream transcoder 204 determines if additional encodings of the current frame are needed. If another encoding is required, processing proceeds back to step 608 where the current frame is encoded into another encoding. If no additional encodings are required, processing proceeds back to step 606, where the next frame is decoded. In one embodiment, the stream transcoder supports generating a plurality of different bit rate encodings, as well as using a plurality of different codecs. The stream transcoder 204 encodes frames into a full permutation of bitrates and codecs. Steps 608, 610, and 612 are repeated for each encoding, on a given frame.

The output framer 206 processing begins in step 614 when frames are enqueued by the stream transcoder 204. The stream transcoder 204 produces multiple output frames for each input frame. In step 614, the output framer 206 maps each output frame to a specific output segment file, creating a new segment file in the media storage 216 if necessary. The output framer 206 synchronizes encoding configurations with unique segment files. In one embodiment, the output framer 206 also packs each frame into a plurality of segment file formats. In one embodiment, the frame formats include MPEG-TS and the custom frame format 300. In another embodiment, the frame format may include FLV or any other suitable container format, as should be known to those skilled in the art.

In step 616, the output framer 206 checks to see if the custom frame format for the RTP protocol 300 is required. If the custom frame format for the RTP protocol 300 is not required, then processing continues to step 620. If the custom frame format for the RTP protocol 300 is required, then processing proceeds to step 618 where the RTP packet headers 314, RTP padding 318, and the segment frame header 306 are added to the frame. The frame is then appended to the appropriate segment file, stored in the media storage 216, and processing continues to step 620. In one embodiment, only the custom format for the RTP protocol is required. In another embodiment, additional custom formats for RTMP or other protocols may be required. Steps 616 and 618 should be repeated for each additional custom frame format required.

In step 620, the output framer 206 checks to see if the MPEG-TS format is required. If the MPEG-TS format is not required, then processing continues to step 624. If the MPEG-TS format is required, then processing proceeds to step 622 where the frame and MPEG metadata headers are added to the appropriate segment file, stored in the media storage 216, and processing continues to step 624. In step 624, the output framer 206 checks to see if the segments are complete. In one embodiment, the segments are of a fixed duration, measured in seconds S. Given the constant frame rate R of the stream transcoder 204 output, the segments each contain a fixed number of frames F, where $F=S*R$. If the segment is not yet complete, processing proceeds back to step 614. If the segment(s) are complete, processing proceeds to step 626.

In step 626, the output framer performs any file post-processing. In one embodiment, file header reordering may be used to optimize the segment for client parsing. In another embodiment, additional hint tracks may be added to aid in client parsing. In another embodiment, additional compression may be applied to optimize segment delivery. Once the post-processing is complete, the output framer 206 notifies the segment encryptor 208 that the new segment(s) is available. The output framer 206 proceeds back to step 614, while the segment encryptor 208 proceeds to step 628.

In step 628, the segment encryptor 208 checks to see if encryption is required. If encryption is not required, processing continues to step 632. If encryption is required, processing continue to step 630 where the segment encryptor 208 reads the segment(s) from the media storage 218, encrypts the segment(s), and writes the segment(s) back out to the media storage 218, before continuing on to step 632. In step 632, the segment encryptor 208 notifies the segment uploader 210 that the new segment(s) is available. The segment encryptor 208 proceeds back to step 628 to wait for the next segment. The segment upload proceeds to step 634 where the segment is uploaded to the network storage 104.

FIG. 9 is a flow chart 700 describing the process of delivering a live stream via HTTP to a client device 108 which supports RTSP. The process starts in step 702, when a user requests a video. The downloader 402 retrieves the first segment from the HTTP server 106 and signals the native RTSP media player 410 to initiate its RTSP connection to the RTSP server 408. The RTSP handshake and RTP port negotiation take place in parallel as the process continues to step 704. In step 704, the downloader 402 writes the segment to the media buffer 420 and notifies the segment decryptor 404 that a new segment is available. The downloader 402 proceeds to step 706, while the segment decryptor 404 proceeds to step 714.

In step 706, the downloader 402 checks to see if a bit rate change is required. Given the fixed segment duration of S seconds, download of live segments must take less than S seconds. If the download time for the previous segment exceeded some threshold T, where T<S, then a transition to a lower bit rate is required. If the download time for the previous segment was below a alternate threshold T', where T'<<S, then a transition to a higher bit rate may be required. In one embodiment, given three bit rate encodings, encoded at bitrates: B, B', B'', where B<B'<B'', the threshold T, for switching from B' to B, would be: $T=C*S$, where C is a constant multiplier and C<1.0 (e.g. C=0.8). In one embodiment, given three bit rate encodings, encoded at bitrates: B, B', B'', where B<B'<B'', the threshold T', for switching from B' to B'' would be: $T'=(C*S)*(B'/B'')$, where C is a constant multiplier and C<1.0 (e.g. C=0.8) and B'/B'' represents the ratio of additional bandwidth required to support the new bit rate. In another embodiment, different thresholds may be used to favor upward or downward transitions. In deployments where high bandwidth and high network availability is expected, upward transitions may be favored. In deployments where network interruption is likely, downward transitions may be favored. In one embodiment, historical average segment download times are used to account for hysteresis. If the download time for the previous segment was between T' and T, then no action is needed, and processing continues to step 708. If a bit rate change is required, processing continues to step 708, where the new bit rate is chosen, then proceeds to step 710.

In step 710, the downloader 402 determines file name of the next segment. In one embodiment, the file names follow a well known naming convention such that bit rate and sequence number are embedded in the file name. In another embodiment, the file names may be retrieved from a Web service interface. The downloader 402 then begins polling for the next segment. In one embodiment, the downloader 402 calculates the time when the next segment will be available and waits until then to poll. In another embodiment, the downloader 402 may discount the segment availability time by the round trip delay for requesting the segment. In another embodiment, the downloader 402 begins polling immediately but uses an exponential decay algorithm to poll faster as the next segment availability time gets nearer. Once a new segment is retrieved, the downloader 402 returns to step 704.

In step 714, the segment decryptor 404 checks to see if the segment is encrypted. If the segment is not encrypted, then processing continues to step 718. If the segment is encrypted, processing continues to step 716, where the segment decryptor 404 reads in the segment from the media buffer 420, decrypts the segment, and writes the segment back out to the media buffer 420, then continues to step 718. In step 718, the segment decryptor 404 notifies the segment parser 406 that the new segment is available. The segment decryptor 404 returns to step 714, while the segment parser 406 proceeds to step 720.

In step 720, the segment parser 406 begins processing the custom segments 302 by extracting the next RTP packet 308. The custom segments 302 are parsed sequentially, using the payload lengths 312 to determine frame 304 boundaries. Each RTP packet 308 processed individually. The segment parser 406 queues the packet to the RTSP server 410, in step 722. In step 724, the segment parser 406 checks to see if the current frame is the last frame in the segment. If the current frame is not the last frame, the segment parser 406 proceeds back to step 720 to process the next frame. If the current frame is the last frame, the segment parser 406 proceeds to step 726 where it purges the segment, then continues back to step 720 to wait for the next segment. In one embodiment, segments are immediately purged by the segment parser 406. In another embodiment, the segment parser 406 waits until the media buffer 420 is full, before purging segments. If the mobile client 108 has limited memory immediate purging may be required, to make room for new segments in the media buffer 420. If the network is expected to have high error rates, immediate purging also frees up cache space in the media buffer 420, allowing more segments to be prefetched, which helps protect against future network errors. If the client application wishes to support rewind capabilities, delayed purging allows the media buffer 420 to cache previous segments for immediate access, when requested by the media player 410, rather than having to delay while the segment is re-downloaded.

The RTSP server 408 processes requests from the media player 410 asynchronously from the segment retrieval. Once the media player 410 negotiates the RTP connections 416 and 418 for the streaming session, the RTSP server 408 sends RTP packets 308 in a paced fashion, as dictated by timestamps in the RTP headers 314, as should be known to those skilled in the art. Step 728 shows the RTSP server 408 sending RTP packets to the media player 410. The RTSP server 408 maintains separate queues and separate timers for audio and video RTP packets to simplify parsing and delivery.

FIG. 10 is a flow chart 800 describing the process of delivering a live stream via HTTP to a client device 108 which supports HTTP Live Streaming. The process starts in step 802, when a user requests a video. The downloader 402 retrieves the initial segments from the HTTP server 106 and signals the native HTTP Live Streaming media player 510 to initiate its HTTP connection to the HTTP server 508. In one embodiment, the m3u8 playlist requires multiple segments to be available to constitute a valid playlist. In one embodiment, the downloader 402 downloads all the segments so that a valid m3u8 playlist may be generated for the initial media player 510 request. In another embodiment, only the first segment is downloaded and fake segments are used for the other segments, when generating the playlist. Processing then continues to step 804. In step 804, the downloader 402 writes the segment to the media buffer 420 and notifies the segment decryptor 404 that a new segment is available. The downloader 402 proceeds to step 806, while the segment decryptor 404 proceeds to step 814.

In step 806, the downloader 402 checks to see if a bit rate change is required. Given the fixed segment duration of S seconds, download of live segments must take less than S seconds. If the download time for the previous segment exceeded some threshold T, where T<S, then a transition to a lower bit rate is required. If the download time for the previous segment was below a alternate threshold T', where T'<<S, then a transition to a higher bit rate may be required. In one embodiment, given three bit rate encodings, encoded at bitrates: B, B', B", where B<B'<B", the threshold T, for switching from B' to B, would be: T=C*S, where C is a constant multiplier and C<1.0 (e.g. C=0.8). In one embodiment, given three bit rate encodings, encoded at bitrates: B, B', B", where B<B'<B", the threshold T', for switching from B' to B" would be: T'=(C*S)*(B'/B"), where C is a constant multiplier and C<1.0 (e.g. C=0.8) and B'/B" represents the ratio of additional bandwidth required to support the new bit rate. In another embodiment, different thresholds may be used to favor upward or downward transitions. In deployments where high bandwidth and high network availability is expected, upward transitions may be favored. In deployments where network interruption is likely, downward transitions may be favored. In one embodiment, historical average segment download times are used to account for hysteresis. If the download time for the previous segment was between T' and T, then no action is needed, and processing continues to step 808. If a bit rate change is required, processing continues to step 806, where the new bit rate is chosen, then proceeds to step 808.

In step 808, the downloader 402 determines file name of the next segment. In one embodiment, the file names follow a well known naming convention such that bit rate and sequence number are embedded in the file name. In another embodiment, the file names may be retrieved from a Web service interface. The downloader 402 then begins polling for the next segment. In one embodiment, the downloader 402 calculates the time when the next segment will be available and waits until then to poll. In another embodiment, the downloader 402 may discount the segment availability time by the round trip delay for requesting the segment. In another embodiment, the downloader 402 begins polling immediately but uses an exponential decay algorithm to poll faster as the next segment availability time gets nearer. Once a new segment is retrieved, the downloader 402 returns to step 804.

In step 814, the segment decryptor 404 checks to see if the segment is encrypted. If the segment is not encrypted, then processing continues to step 818. If the segment is encrypted, processing continues to step 816, where the segment decryptor 404 reads in the segment from the media buffer 420, decrypts the segment, and writes the segment back out to the media buffer 420, then continues to step 818. In step 818, the segment decryptor 404 notifies the playlist generator 506 that the new segment is available. The segment decryptor 404 returns to step 814, while the playlist generator 506 proceeds to step 820.

In step 820, the playlist generator 506 updates the current playlist adding the new segment and removing the oldest segment. Once segments have been removed from the playlist, the segments are no longer required in the media buffer 420. In one embodiment, segments are immediately purged by the playlist generator 506. In another embodiment, the playlist generator 506 waits until the media buffer 420 is full, before purging segments. If the mobile client 108 has limited memory immediate purging may be required, to make room for new segments in the media buffer 420. If the network is expected to have high error rates, immediate purging also frees up cache space in the media buffer 420, allowing more segments to be prefetched, which helps protect against future network errors. If the client application wishes to support rewind capabilities, delayed purging allows the media buffer 420 to cache previous segments for immediate access, when requested by the media player 510, rather than having to delay while the segment is re-downloaded.

The playlist generator 506 then notifies the HTTP Server 508 of the playlist update. Step 822 shows the HTTP server 508 getting the notification from the playlist generator 506, however, the HTTP server 508 processes requests from the media player 510 asynchronously from the segment retrieval. When the media player 510 requests playlists, the HTTP server 508 provides the most recent playlist made available by the playlist generator 506. When the media player 510 requests segments, the HTTP server 508 retrieves the segments from the media buffer 420 and returns them to the media player 510. The media player 510 should only request segments that are in the playlist. The playlist generator 506 ensures that segments in the playlist exist in the media buffer 420.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

What is claimed is:

1. Apparatus for retrieving live streaming data from a server, comprising:
    a processor for executing a segment downloader and network proxy;
    a memory for storing downloaded segments; instructions executable by the processor to constitute a rendering engine for rendering downloaded data, wherein the rendering engine communicates through the network proxy; and
    instructions executable by the processor for: measuring bandwidth at a client device;
    selecting an appropriate bit rate for a current bandwidth in a delivery channel; selecting an appropriate encoding for the client device; and
    performing the following with respect to segments of the live streaming data: (1) requesting the segments from a server, (2) downloading the segments via the delivery channel, (3) storing the downloaded segments, (4) decrypting the stored segments, (5) parsing the decrypted segments, and (6) delivering the parsed segment data to a local media player through the network proxy,
    wherein the network proxy is a proxy server engaging in internal client-server media delivery with the local media player for delivering the parsed segment data to the local media player in response to explicit segment data requests from the local media player according to an internal client-server media delivery protocol.

2. Apparatus according to claim 1, wherein the segments are requested and downloaded using the HTTP protocol.

3. Apparatus according to claim 1, wherein the stored segments are deleted upon delivery of the parsed segment data to the local media player.

4. Apparatus according to claim 1, wherein the stored segments are kept for a period of time after the parsed segment data is delivered to the local media player to support a rewind function.

5. Apparatus according to claim 1, wherein segment parsing includes decoding individual frames.

6. Apparatus according to claim 1, wherein segment parsing includes parsing file location information for use in generating playlists.

7. Apparatus according to claim 1, wherein the local network proxy is an HTTP server.

8. Apparatus according to claim 1, wherein the local network proxy is an RTSP server.

9. A method for retrieving live streaming data from a server, comprising:
    measuring bandwidth at a client device;
    selecting an appropriate bit rate for a current bandwidth in a delivery channel; selecting an appropriate encoding for the client device; and
    performing the following with respect to segments of the live streaming data: (1) requesting the segments from a server, (2) downloading the segments via the delivery channel, (3) storing the downloaded segments, (4) decrypting the stored segments, (5) parsing the decrypted segments, and (6) delivering the parsed segment data to a local media player through a network proxy,
    wherein the network proxy is a proxy server engaging in internal client-server media delivery with the local media player for delivering the parsed segment data to the local media player in response to explicit segment data requests from the local media player according to an internal client-server media delivery protocol.

10. A method according to claim 9, wherein the segments are requested and downloaded using the HTTP protocol.

11. A method according to claim 9, wherein the stored segments are deleted upon delivery of the parsed segment data to the local media player.

12. A method according to claim 9, wherein the stored segments are kept for a period of time after the parsed segment data is delivered to the local media player to support a rewind function.

13. A method according to claim 9, wherein segment parsing includes decoding individual frames.

14. A method according to claim 9, wherein segment parsing includes parsing file location information for use in generating playlists.

15. A method according to claim 9, wherein the local network proxy is an HTTP server.

16. A method according to claim 9, wherein the local network proxy is an RTSP server.

17. An apparatus, comprising:
    a processor for executing a segment downloader and network proxy;
    a memory for storing downloaded segments;
    instructions executable by the processor to constitute a rendering engine for rendering downloaded data, wherein the rendering engine communicates through the network proxy; and
    instructions executable by the processor for:
        connecting to a server to retrieve segments;
        decrypting retrieved file data;
        storing retrieved and decrypted segment data to the memory;
        detecting a change in bandwidth that necessitates a change in bit rate and changing the bit rate at which future segments are retrieved;
        parsing frames from the segment;
        providing frames to the network proxy;
        accepting connections to the network proxy from the rendering engine; and
        streaming frame data to the rendering engine from the network proxy,
    wherein the network proxy is a proxy server engaging in internal client-server media delivery with the local media player for delivering the parsed segment data to the local media player in response to explicit segment data requests from the local media player according to an internal client-server media delivery protocol.

18. An apparatus, comprising:
    a processor for executing a segment downloader and network proxy;
    a memory for storing downloaded segments;
    instructions executable by the processor to constitute a rendering engine for rendering downloaded data, wherein the rendering engine communicates through the network proxy; and
    instructions executable by the processor for:
        connecting to a server to retrieve segments;
        decrypting retrieved file data;

storing retrieved and decrypted segment data to the memory;

detecting a change in bandwidth that necessitates a change in bit rate and changing the bit rate at which future segments are retrieved;

generating a playlist file for the stored segments;

accepting connections to the network proxy from the rendering engine; and sending playlist and segment data to the rendering engine from the network proxy, wherein the network proxy is a proxy server engaging in internal client-server media delivery with the local media player for delivering the parsed segment data to the local media player in response to explicit segment data requests from the local media player according to an internal client-server media delivery protocol.

19. Apparatus according to claim 1 wherein the segment downloader is a client engaging in external client-server media delivery with the server for downloading the segments from the server according to a separate external client-server media delivery protocol.

20. Apparatus according to claim 19, wherein the external client-server media delivery protocol is of a different type than the internal client-server media delivery protocol and the network proxy is a protocol conversion proxy converting from adaptive bitrate segment delivery from the server to variable-bitrate playback by the local media player.

21. Apparatus according to claim 5, wherein parsing includes separating out RTP frames for audio, RTP frames for video, RTCP frames for audio, RTCP frames for video and proprietary control frames from the segment.

22. Apparatus according to claim 6, wherein the playlist generated is one of an HTTP Live Streaming m3u8 manifest file or a Smooth Streaming manifest file.

23. Apparatus according to claim 7, wherein the HTTP server responds to HTTP Live Streaming m3u8 manifest file requests, HTTP Live Streaming MPEG-TS segment requests, Smooth Streaming manifest file requests, or Smooth Streaming MP4 fragment requests with downloaded segment data and information.

24. Apparatus according to claim 8, wherein the RTSP server creates RTP channels for audio, RTP channels for video, RTCP channels for audio, and RTCP channels for video, over which parsed segment data is streamed.

25. A method according to claim 13, wherein parsing includes separating out RTP frames for audio, RTP frames for video, RTCP frames for audio, RTCP frames for video and proprietary control frames from the segment.

26. A method according to claim 14, wherein the playlist generated is one of an HTTP Live Streaming m3u8 manifest file or a Smooth Streaming manifest file.

27. A method according to claim 15, wherein the HTTP server responds to HTTP Live Streaming m3u8 manifest file requests, HTTP Live Streaming MPEG-TS segment requests, Smooth Streaming manifest file requests, or Smooth Streaming MP4 fragment requests with downloaded segment data and information.

28. A method according to claim 16, wherein the RTSP server creates RTP channels for audio, RTP channels for video, RTCP channels for audio, and RTCP channels for video, over which parsed segment data is streamed.

* * * * *

UNITED STATES PATENT AND TRADEMARK OFFICE
CERTIFICATE OF CORRECTION

PATENT NO. : 8,874,779 B2
APPLICATION NO. : 13/233838
DATED : October 28, 2014
INVENTOR(S) : Ma et al.

Page 1 of 1

It is certified that error appears in the above-identified patent and that said Letters Patent is hereby corrected as shown below:

In The Specification

In Column 3, Line 57, delete "buffer." and insert -- buffer --, therefor.

In Column 14, Line 5, delete "a alternate" and insert -- an alternate --, therefor.

In Column 14, Line 59, delete "RTSP server 410," and insert -- RTSP server 408, --, therefor.

In Column 15, Line 49, delete "a alternate" and insert -- an alternate --, therefor.

In The Claims

In Column 19, Line 17, in Claim 19, delete "claim 1" and insert -- claim 1, --, therefor.

Signed and Sealed this
Sixteenth Day of August, 2016

Michelle K. Lee
*Director of the United States Patent and Trademark Office*